United States Patent
Kouchi et al.

(10) Patent No.: US 7,686,318 B2
(45) Date of Patent: Mar. 30, 2010

(54) MOTORCYCLE PASSENGER FOOTREST STRUCTURE

(75) Inventors: Kaoru Kouchi, Kakogawa (JP); Keishi Fukumoto, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 83 days.

(21) Appl. No.: 11/519,419

(22) Filed: Sep. 12, 2006

(65) Prior Publication Data

US 2007/0062327 A1    Mar. 22, 2007

(30) Foreign Application Priority Data

Sep. 14, 2005 (JP) .............................. 2005-266710

(51) Int. Cl.
*B62J 25/00* (2006.01)

(52) U.S. Cl. ...................................................... 280/291

(58) Field of Classification Search ................. 280/202, 280/291; 224/413, 463, 441
See application file for complete search history.

(56) References Cited

U.S. PATENT DOCUMENTS

| | | | | | |
|---|---|---|---|---|---|
| 1,030,844 | A | * | 6/1912 | Howell | 280/202 |
| 4,096,980 | A | * | 6/1978 | Clow | 224/441 |
| 4,993,731 | A | * | 2/1991 | Fuller | 280/202 |
| 5,622,374 | A | * | 4/1997 | Rudeen et al. | 280/202 |
| D392,600 | S | * | 3/1998 | Robb et al. | D12/110 |
| 5,779,254 | A | * | 7/1998 | James et al. | 280/291 |
| 6,073,948 | A | * | 6/2000 | Motojima et al. | 280/152.2 |
| 6,131,427 | A | * | 10/2000 | Webber et al. | 70/235 |
| 6,152,474 | A | * | 11/2000 | Rupert | 280/291 |
| 6,173,983 | B1 | * | 1/2001 | Moore | 280/291 |
| D440,190 | S | * | 4/2001 | Buell | D12/114 |
| 6,234,266 | B1 | * | 5/2001 | Saiki | 180/219 |
| 6,293,450 | B1 | * | 9/2001 | Aron | 224/430 |
| 6,502,658 | B1 | * | 1/2003 | Nagashii | 180/219 |
| 6,820,782 | B1 | * | 11/2004 | Monson | 224/413 |
| 7,114,739 | B2 | * | 10/2006 | Colano | 280/291 |
| 7,195,263 | B2 | * | 3/2007 | Ishikawa | 280/219 |
| D546,733 | S | * | 7/2007 | Tanaka | D12/114 |
| 7,270,212 | B2 | * | 9/2007 | Takahashi et al. | 180/219 |
| 7,270,213 | B2 | * | 9/2007 | Suzuki et al. | 180/219 |
| 2002/0158441 | A1 | * | 10/2002 | Essinger | 280/291 |
| 2003/0122002 | A1 | * | 7/2003 | Monson | 239/600 |
| 2007/0068201 | A1 | * | 3/2007 | Fujimoto et al. | 70/57 |
| 2008/0125285 | A1 | * | 5/2008 | Takeuchi | 477/79 |

FOREIGN PATENT DOCUMENTS

| | | | |
|---|---|---|---|
| JP | 62-72886 | | 5/1987 |
| JP | 05016853 A | * | 1/1993 |
| JP | 09150774 A | * | 6/1997 |
| JP | 2006015839 A | * | 1/2006 |
| JP | 2009107567 A | * | 5/2009 |

* cited by examiner

*Primary Examiner*—Lesley Morris
*Assistant Examiner*—Daniel Yeagley

(57) ABSTRACT

A passenger footrest structure (30) includes a footrest support bracket (31) for supporting a passenger footrest (33) and an accessory mount (37) formed therewith for supporting an accessory part (40, 50, 60, 70, 80) other than the footrest (33).

21 Claims, 7 Drawing Sheets

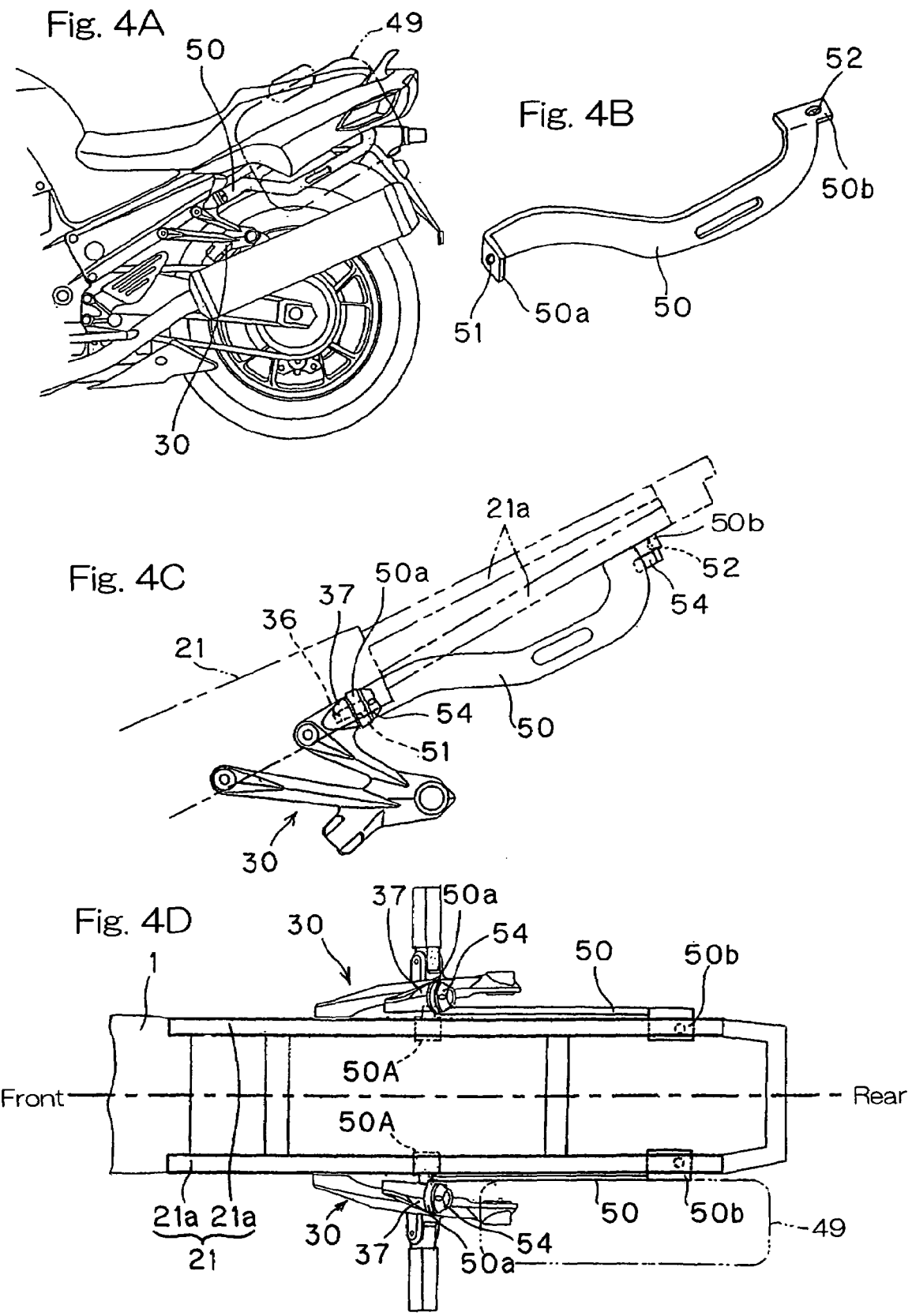

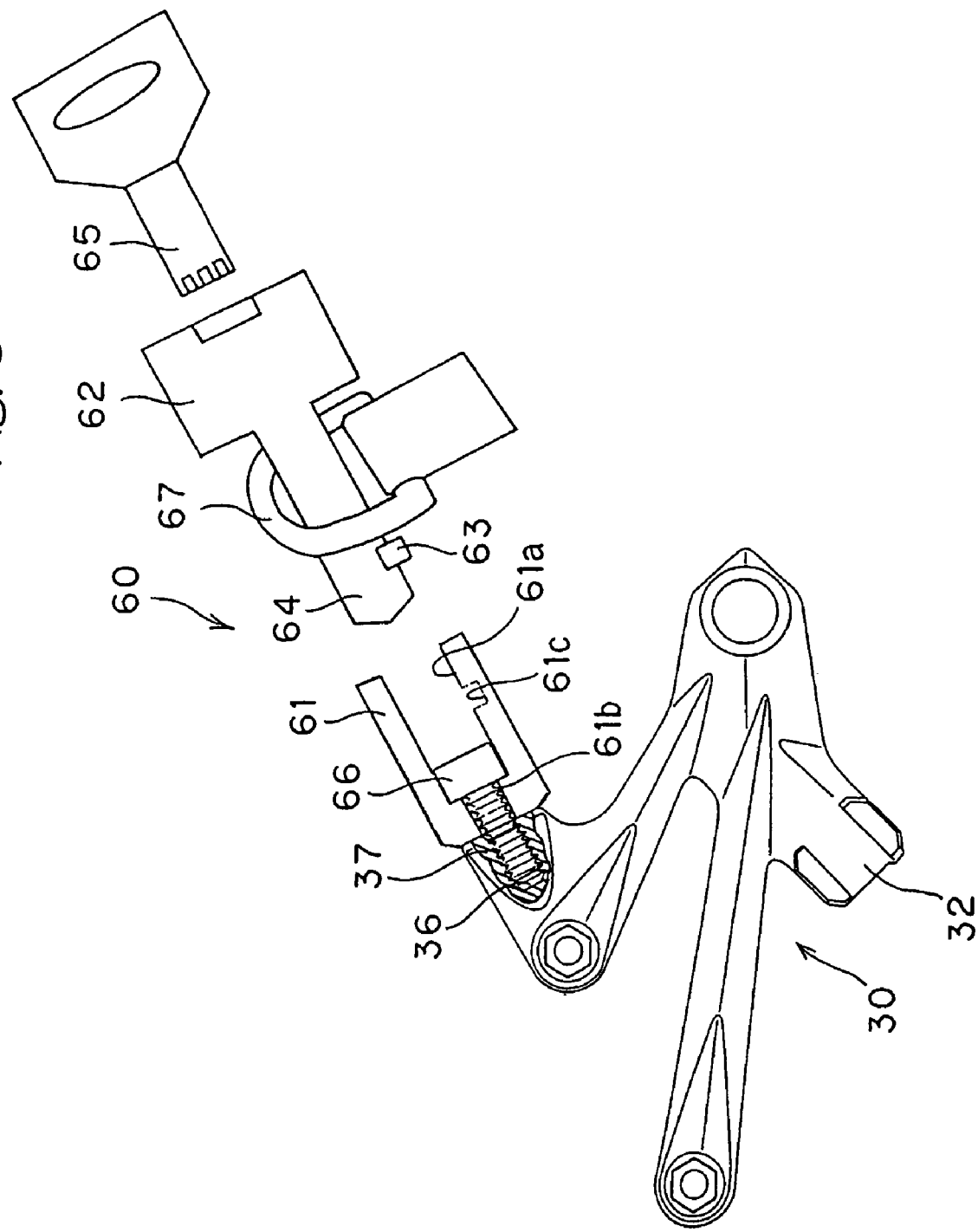

MOTORCYCLE PASSENGER FOOTREST STRUCTURE

BACKGROUND OF THE INVENTION

1. Field of the Invention

The present invention relates to a passenger footrest structure used in a motorcycle.

2. Description of the Prior Art

The passenger footrests or foot pegs employed in a motorcycle for the support of feet of a fellow passenger occupying a fellow passenger's seat behind a driver's or rider's seat are generally rigidly secured to a motorcycle frame structure through respective footrest support brackets. This type of footrest support brackets employed on each side of the motorcycle frame structure is disclosed in, for example, the Japanese Laid-open Utility Model Publication No. 62-72886. The prior art footrest structures are exclusively designed to support the respective feet of the fellow passenger and are in no way designed for any other purpose than for the support of the fellow passenger's feet.

As is well known to those skilled in the art, some types of motorcycles are equipped with one or more of motorcycle accessory parts including, for example, a grip bar, a stay for the support of a pannier case, a helmet holder and a rope anchor. However, those motorcycle accessory parts have hitherto been mounted on the motorcycle through brackets rigidly secured to the motorcycle frame structure and dedicated to respectively accommodate those accessory parts on one-to-one basis and, accordingly, the number of component parts used in the motorcycle increases.

SUMMARY OF THE INVENTION

In view of the foregoing, the present invention has for its primary object to provide a motorcycle passenger footrest structure capable of accommodating selectively one of the various motorcycle accessory parts.

In order to accomplish the foregoing object, the present invention provides a motorcycle passenger footrest structure, which includes a footrest support bracket for supporting a passenger footrest or foot peg and an accessory mount formed therewith for supporting an accessory part other than the foot peg. The accessory parts includes a grip bar, a stay for the support of a pannier case, a helmet holder, a rope anchor, and any other component part employed in association with the motorcycle.

According to the present invention, when one of the accessory parts is mounted on the accessory mount of the passenger footrest structure, such accessory part can easily be mounted on the motorcycle through the passenger footrest structure. Accordingly, there is no need to employ one or more separate brackets that are dedicated to respectively accommodate those accessory parts on one-to-one basis In a preferred embodiment of the present invention, the passenger footrest structure may include a connecting portion, through which the footrest support bracket is rigidly secured to a motorcycle frame structure, in which case the accessory mount may be positioned in proximity to the connecting portion. Positioning of the accessory mount in proximate to the connecting portion of the passenger footrest structure is effective to allow the accessory mount to have an increased rigidity enough to support a large load imposed on the accessory mount.

In another preferred embodiment of the present invention, the accessory mount may have a helically threaded hole defined therein, so that the selected accessory part can be threaded into the helically threaded hole directly or through a fastening member. By so doing, the accessory part can easily be secured to the passenger footrest section.

The helically threaded hole preferably extend diagonally upwardly in a rearward direction of a motorcycle frame structure, to avoid the fastening member, for example, a fastening bolt used to secure the accessory part to the accessory mount from protruding outwardly from the motorcycle.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 4A is a fragmentary side view of the rear portion of the motorcycle, showing a stay for a pannier case secured to the passenger footrest structure;

FIG. 4B is a perspective view showing the stay for the pannier case shown in FIG. 4A;

FIG. 4C is a side view, on an enlarged scale, showing the stay for the pannier case secured to the passenger footrest structure;

FIG. 4D is a plan view of the passenger footrest structures each mounted on the respective side of a motorcycle frame structure;

FIG. 5 is an exploded view showing the manner, in which a helmet holder is secured to the passenger footrest structure;

DETAILED DESCRIPTION OF THE EMBODIMENTS

Hereinafter, a preferred embodiment of the present invention will be described in detail with reference to the accompanying drawings.

Figure 1:
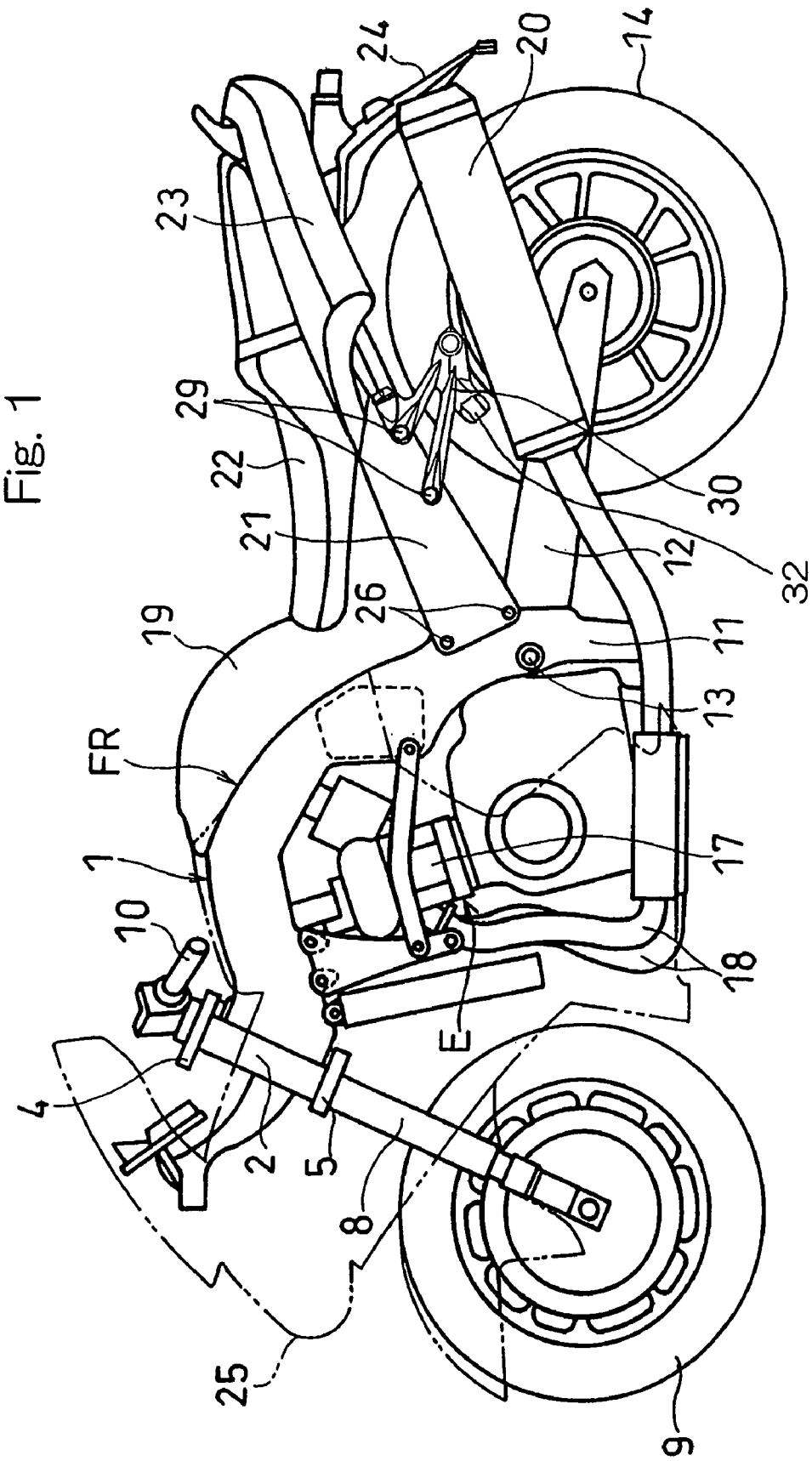
FIG. 1 is a side view of a motorcycle equipped with a passenger footrest structure according to a preferred embodiment of the present invention.

FIG. 1 illustrates a side view of a motorcycle that is equipped with a passenger footrest structure according to the preferred embodiment of the present invention. The motorcycle includes a motorcycle frame structure FR made up of a main frame 1, forming a front half of the motorcycle frame structure FR, and a rear frame 21 forming a rear half of the motorcycle frame structure FR and rigidly coupled with a rear portion of the main frame 1 by fastening bolts 26.

A head tube 2 is secured to a front portion of the main frame 1. Upper and lower brackets 4 and 5 are supported through a steering shaft (not shown) that is rotatably inserted through the head tube 2. The upper and lower brackets 4 and 5 support front fork members 8, with a front wheel 9 being rotatably supported by respective lower ends of the front fork members 8. A handlebar 10 is mounted on the upper bracket 4 at respective upper ends of the front fork members 8.

The main frame 1 is provided at a rear lower portion with swingarm brackets 11, with which a swingarm 12 is pivotally supported by the swingarm brackets 11 through a pivot shaft 13 for vertical swing movement about the pivot shaft 13. This swingarm 12 rotatably carries a rear wheel 14 at a rear end of the swingarm 12.

A multi-cylinder type combustion engine E including a cylinder head 17 is supported at a position below an intermediate portion of the main frame 1. A plurality of exhaust tubes 18 are fluidly connected at one end with the cylinder head 17 and are also fluidly connected at the opposite end with exhaust mufflers 20 one positioned on each side of the motorcycle frame structure FR.

A unitary seat 22 having a rider's seat area and a fellow passenger's seat area is mounted on the rear frame 21. A rear portion of the rear frame 21 excluding a top portion thereof, where the unitary seat 22 is mounted, has its opposite side areas covered with a tail cover 23. A rear fender 24 is secured to the rear portion of the rear frame 21 to extend rearwardly and downwardly therefrom to cover above the rear wheel 14. A fuel tank 19 is fixedly positioned on an upper portion of the main frame 1 between the handlebar 10 and the unitary seat 22. A fairing 25 made of a synthetic resin is fixedly mounted on a front end of the motorcycle frame structure FR to cover a front to side region of the motorcycle frame structure FR, including a front area forwardly of the handlebar 10 and side areas generally laterally of the motorcycle engine E, as shown by the phantom line.

Figure 2:
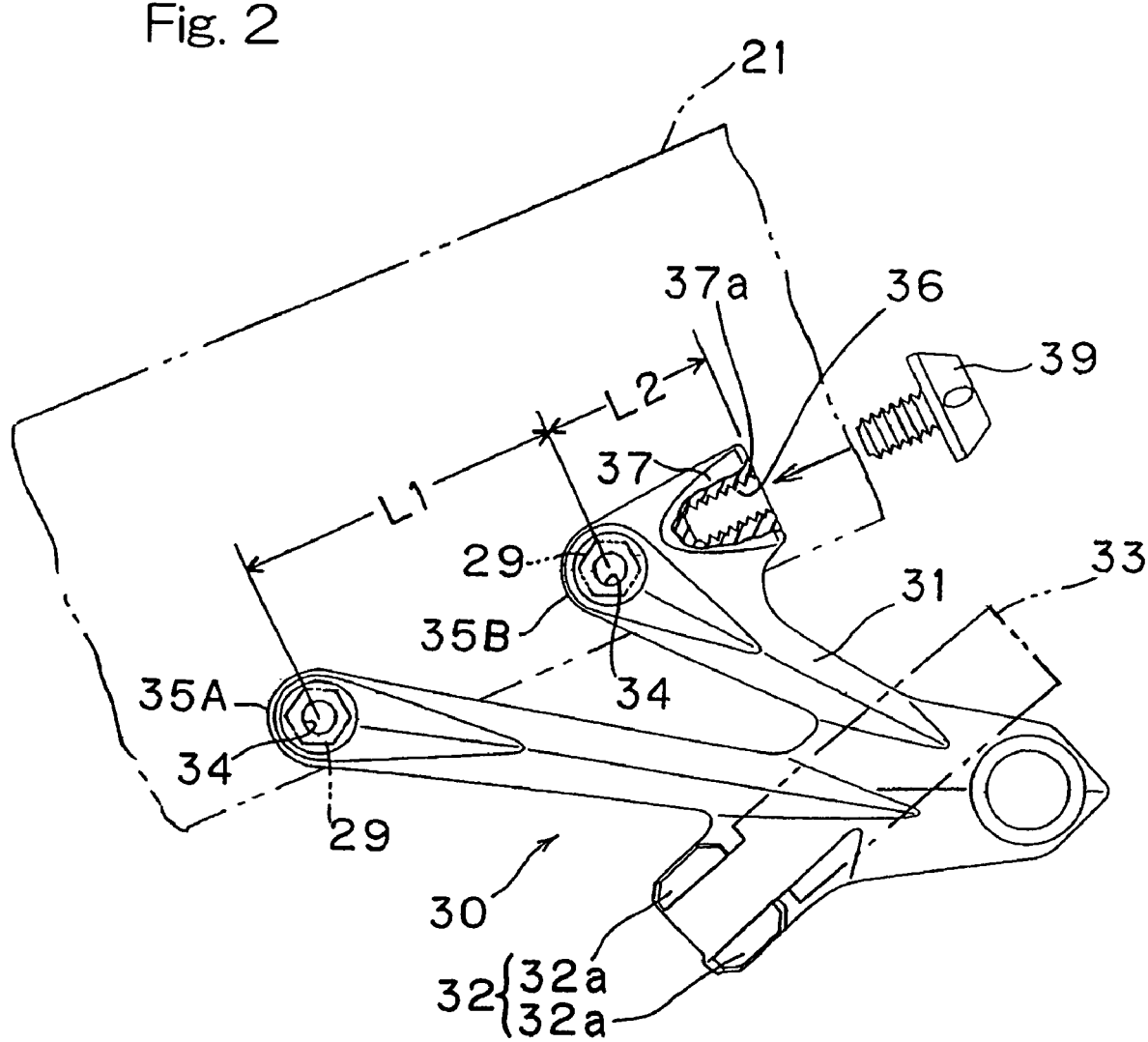
FIG. 2 is a side view of one of the passenger footrest structure according to the present invention.

A passenger footrest structure 30 is secured to each of left and right sides of the rear frame 21 by a plurality of fastening members 29 such as a bolt. As shown in FIG. 2, the passenger footrest structure 30 includes a footrest support bracket 31 of a generally V-shaped configuration having two arms that extends in a forward direction of the motorcycle frame structure FR. A portion of the footrest bracket 31, which corresponds in position to the joint of the two arms, is formed with a footrest mount 32 made up of a pair of lateral projections 32a and 32a. A foldable footrest or foot peg 33 for the support of one of feet of a passenger occupying the fellow passenger's seat area is pivotally supported at one end by the lateral projections 32a and 32a through a common pivot pin (not shown) for movement between folded and laid positions about the common pivot pin. FIG. 2 shows the foldable foot peg 33 held at the folded position by the phantom line.

Respective free end portions of the two arms of the footrest support bracket 31 remote from the joint thereof define connecting portions 35A and 35B each having a bolt insertion hole 34 defined therein. Therefore, the passenger footrest structure 30 is firmly secured to the rear frame 21 by inserting the fastening members 29 into the bolt insertion holes 34 and then firmly threading into internally threaded bolt holes (not shown) defined in the rear frame 21.

A portion of the posterior connecting portion 35B, which is positioned rearwardly of and adjoins the connecting portion 35B, is formed with a motorcycle accessory mount 37 having an internally threaded hole 36 defined therein. The internally threaded hole 36 extends diagonally upwardly in a rearward direction of the motorcycle frame structure FR and in an alignment with a longitudinal axis of the motorcycle accessory mount 37. Where no motorcycle accessory part is used, the internally threaded hole 36 is closed or plugged with an externally threaded member such as an ornamental bolt 39. In other words, the internally threaded hole 36 is utilized to selectively accommodate one of the ornamental bolt 39 and any other motorcycle accessory part.

An annular end face 37a of the motorcycle accessory mount 37 is preferably positioned so close to the posterior connecting portion 35B as possible in order to increase the rigidity of the motorcycle accessory mount 37. For this purpose, the distance L2 between the connecting portion 35B, particularly the longitudinal axis of the bolt insertion hole 34 in the connecting portion 35B, and the annular end face 37a is preferably chosen be equal to or smaller than the distance L1 between the connecting portions 35A and 35B, particularly between the longitudinal axes of the respective bolt insertion holes 34 in the connecting portions 35A and 35B. More preferably, the distance L2 is of a value equal to or smaller than two thirds of the distance L1, that is, $L2 \leq 2 \cdot L1/3$.

The motorcycle accessory parts, which are selectively mounted on the motorcycle accessory mount 37, may include, in addition to the ornamental bolt 39, a grip bar 40 shown in FIG. 3A, a stay 50 shown in FIG. 4A for supporting a pannier case, a helmet holder 60 shown in FIG. 5 for supporting a protective helmet, and a rope anchor 70 shown in FIG. 6A for engagement with a package tying rope, each of which will now be described in detail.

Figure 3B:
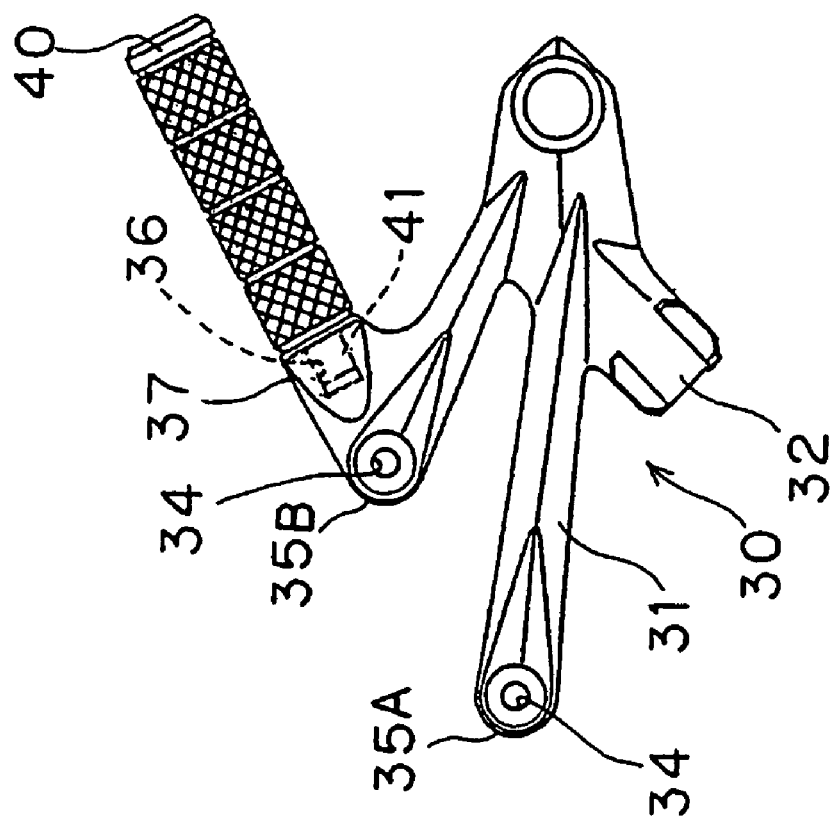
FIG. 3B is a side view, on an enlarged scale, showing the grip bar secured to the passenger footrest structure.
Figure 3A:
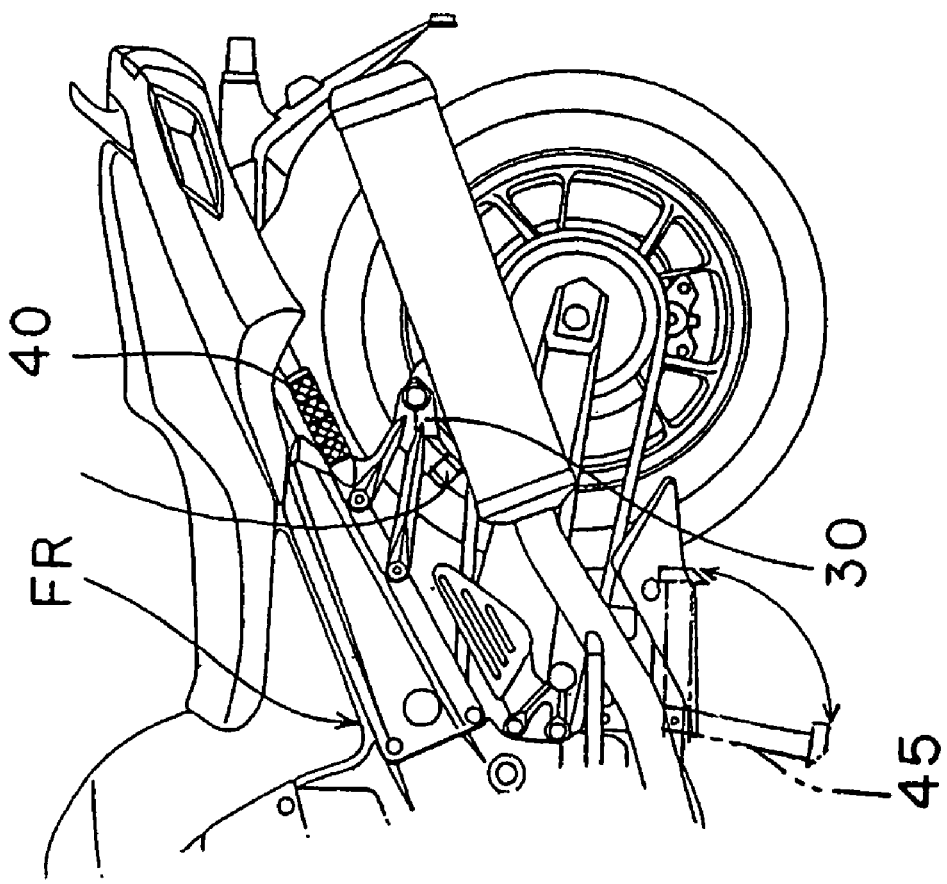
FIG. 3A is a fragmentary side view of a rear portion of the motorcycle, showing the manner, in which a grip bar is secured to the passenger footrest structure.

Referring to FIGS. 3A and 3B, the grip bar 40 has its outer peripheral surface knurled to minimize a slippage for a motorcycle rider. This grip bar 40 has a base end formed with an externally threaded fastening member 41 protruding outwardly thereof substantially in alignment with the longitudinal axis thereof and can be secured to the accessory mount 37 by threading the fastening member 41 into the internally threaded hole 36 in the accessory mount 37.

This grip bar 40 is utilized in the following manner. Specifically, when the motorcycle is desired to be held in an upright position, a center stand 45 secured to a lower intermediate portion of the motorcycle frame structure FR for pivotal movement between folded and erected positions is kicked to pivot from the folded position towards the erected position. It is generally recognized that the movement of the center stand 45 to the erected position can be facilitated if the rear portion of the motorcycle is lifted when the center stand 45 being pivoted from the folded position to the erected position has been brought into touch with a ground surface. Accordingly, with the grip bar 40 coupled to the accessory mount 37, one can easily lift the rear portion of the motorcycle by gripping the grip bar 40 to thereby aid the center stand 45 to be smoothly moved to the erected position. At this time, one may have his or her right or left hand gripping the handlebar 10 (shown in FIG. 1) and his or her left or right hand gripping the grip bar 40.

The use of the stay 50 for the pannier case 49 on the accessory mount 37 of the passenger footrest structure 30 is shown in FIGS. 4A to 4D. The pannier case stay 50 is in the form of a generally elongated sheet metal and is utilized to support the pannier case 49. This pannier case stay 50 includes, as shown in FIG. 4B, a generally elongated sheet metallic plate having its front and rear end portions bent to define respective front and rear connecting lugs 50a and 50b. Those front and rear connecting lugs 50a and 50b are respectively formed with bolt insertion holes 51 and 52 for receiving corresponding fastening bolts 54. As shown in FIG. 4C, the front connecting lug 50a is connected to the accessory mount 37 by passing one of the fastening bolts 54 into the corresponding bolt insertion hole 51 in the front connecting lug 50a and then threading into the internally threaded hole 36 in the accessory mount 37, and the rear connecting lug 50b is connected to the rear frame 21 by passing the other of the fastening bolts 54 into the corresponding bolt insertion hole 52 in the rear connecting lug 50b and then threading from below into an internally threaded hole (not shown) formed in the rear frame 21. Thus, as shown in FIG. 4D, two pannier case stays 50 can be secured externally to two seat rails 21a and 21a forming respective parts of the rear frame 21.

According to the conventional arrangement, a pannier case stay is secured to a lower portion of each of the seat rails 21a after a front end portion of the stay has been extended inwardly around the rear frame 21 as shown by the double-dotted line 50A. Due to this arrangement, the conventional pannier case stay requires the front end portion to extend a substantial distance to the inside of the rear frame 21.

In contrast thereto, in the present invention, since the front connecting lug 50a in the front end portion of the pannier case stay 50 is connected to the accessory mount 37 of the passenger footrest structure 30 positioned on an outside of each of the seat rails 21a, the pannier case stay 50 needs not extend a substantial distance to the inside of the motorcycle body and, thus, the pannier case stay 50 used in the present invention is indeed compact in size. Also, since the internally threaded hole 36 in the accessory mount 37 extends diagonally upwardly in the rearward direction of the motorcycle frame structure FR and in an alignment with the longitudinal axis of the motorcycle accessory mount 37, the fastening bolt 54 or the ornamental bolt 39, when threaded into the internally threaded hole 36, does not protrude laterally outwardly of the motorcycle body.

It is to be noted that the pannier case stay 50 may be employed on only one side of the rear frame 21.

The use of the helmet holder 60 on the accessory mount 37 of the passenger footrest structure 30 is shown in FIG. 5. The helmet holder 60 includes a bottom-closed tubular receptacle 61 having one end closed, a cylinder lock 62, an elongated holder piece 64 having a retractable lock pin 63 movable between retracted and projected positions in association with the cylinder lock 62, and a key 65 used to selectively open or close the cylinder lock 62. The tubular receptacle 61 has a mount hole 61a defined therein for receiving the elongated holder piece 64. A lock recess 61c is defined in a portion of a peripheral surface of the mount hole 61a for engagement with the lock pin 63.

The closed bottom end of the tubular receptacle 61 has an insertion hole 61b defined therein so that the tubular receptacle 61 can be firmly secured to the accessory mount 37 by inserting a fastening bolt 66 into the insertion hole 61b and then threading into the internally threaded hole 36 in the accessory mount 37 of the passenger footrest structure 30. The key 65 is utilized to set the cylinder lock 62 to an open position, in which the lock pin 63 is held in the retracted position, or to a closed position in which the lock pin 63 is held in the projected position, when the key 65 is inserted into a key hole defined in the cylinder lock 62 and is then turned in either direction relative to the cylinder lock 62.

When the protective helmet is desired to be held by the helmet holder 60, one must insert the key 65 into the key hole of the cylinder lock 62 and then turn it to set the cylinder lock 62 to the open position to allow the lock pin 63 to be retracted into the inside of the holder piece 64. After the lock pin 63 is moved to the retracted position, a catch ring 67 coupled with the protective helmet has to be passed through the holder piece 64, followed by insertion of the holder piece 64 into the mount hole 61a in the tubular receptacle 61. As the final step, the key 65 has to be turned to set the cylinder lock 62 to the closed position to allow the lock pin 63 to project from the holder piece 64 so that the lock pin 63 can engage in the lock recess 61c. In this way, the holder piece 64 is locked to the tubular receptacle 61, which has already firmly been coupled with the accessory mount 37.

Figure 6A:
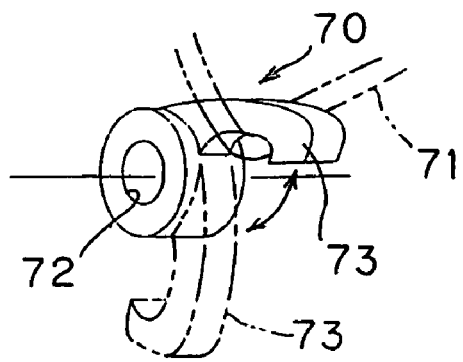
FIG. 6A is a perspective view of a rope anchor secured to the passenger footrest structure.
Figure 6B:
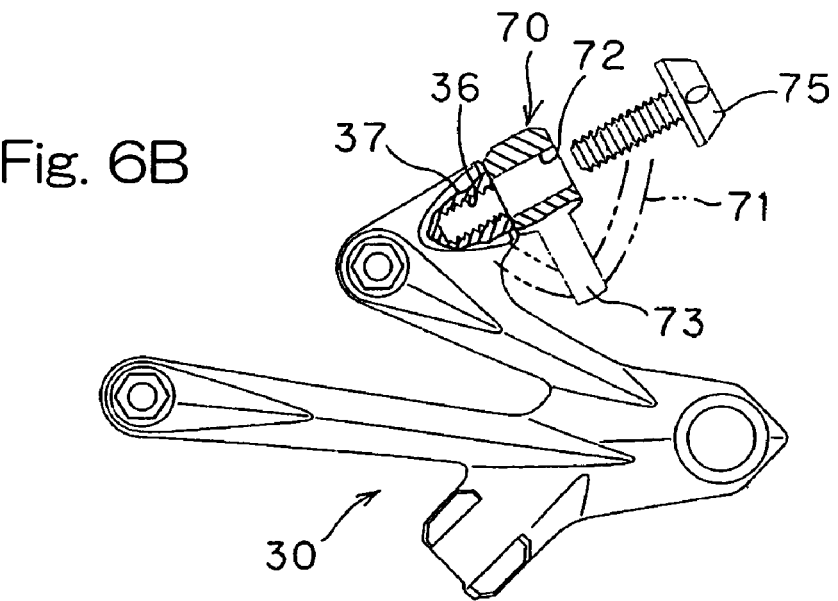
FIG. 6B is an exploded view showing the manner, in which the rope anchor is secured to the passenger footrest structure.
Figure 6C:
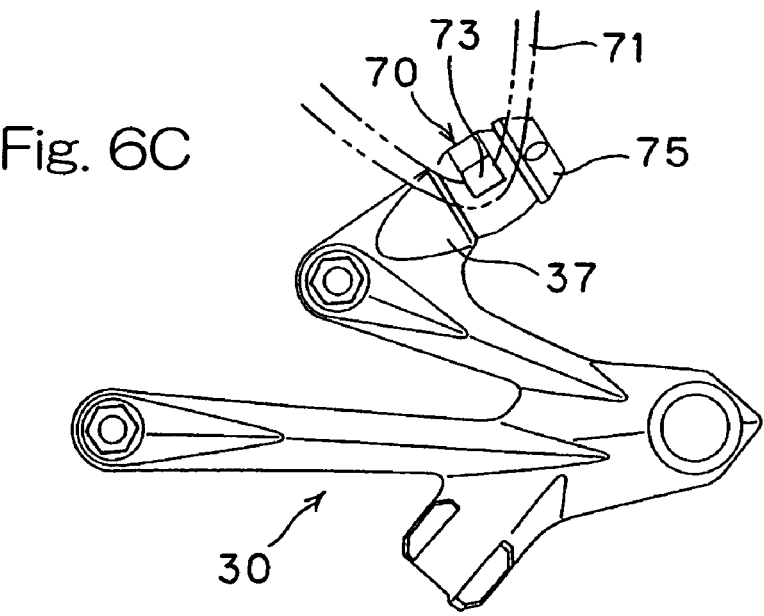
FIG. 6C is a side view of the rope anchor, showing a rope engaged to the rope anchor.

The use of the rope anchor 70 on the accessory mount 37 of the passenger footrest structure 30 is shown in FIGS. 6A to 6C. The rope anchor 70 is utilized for engagement with a package tying rope 71 used to tie a package placed on, for example, the fellow passenger's seat area of the seat 22.

As shown in FIG. 6A, the rope anchor 70 has an insertion hole 72 defined therein and a hook 73 around which the tying rope 71 is engaged. As shown in FIG. 6B, this rope anchor 70 is rotatably coupled with the accessory mount 37 by passing a fastening bolt 75 into the insertion hole 72 and then threading firmly into the internally threaded hole 36 in the accessory mount 37. The fastening bolt 75 is preferably of a length enough to allow a head of the fastening bolt 75 not to tightly contact the rope anchor 70, when the fastening bolt 75 is firmly threaded into the internally threaded hole 36. Accordingly, when the tying rope 71 is engaged around the hook 73, the rope anchor 70 can be rotated to allow the hook 73 to protrude laterally outwardly from the motorcycle body as shown by the solid lines in FIGS. 6A and 6C. On the other hand, when the rope anchor 70 is not in use, the hook 73 can be held in position oriented downwards as shown by the phantom line in FIG. 6A.

Figure 7:
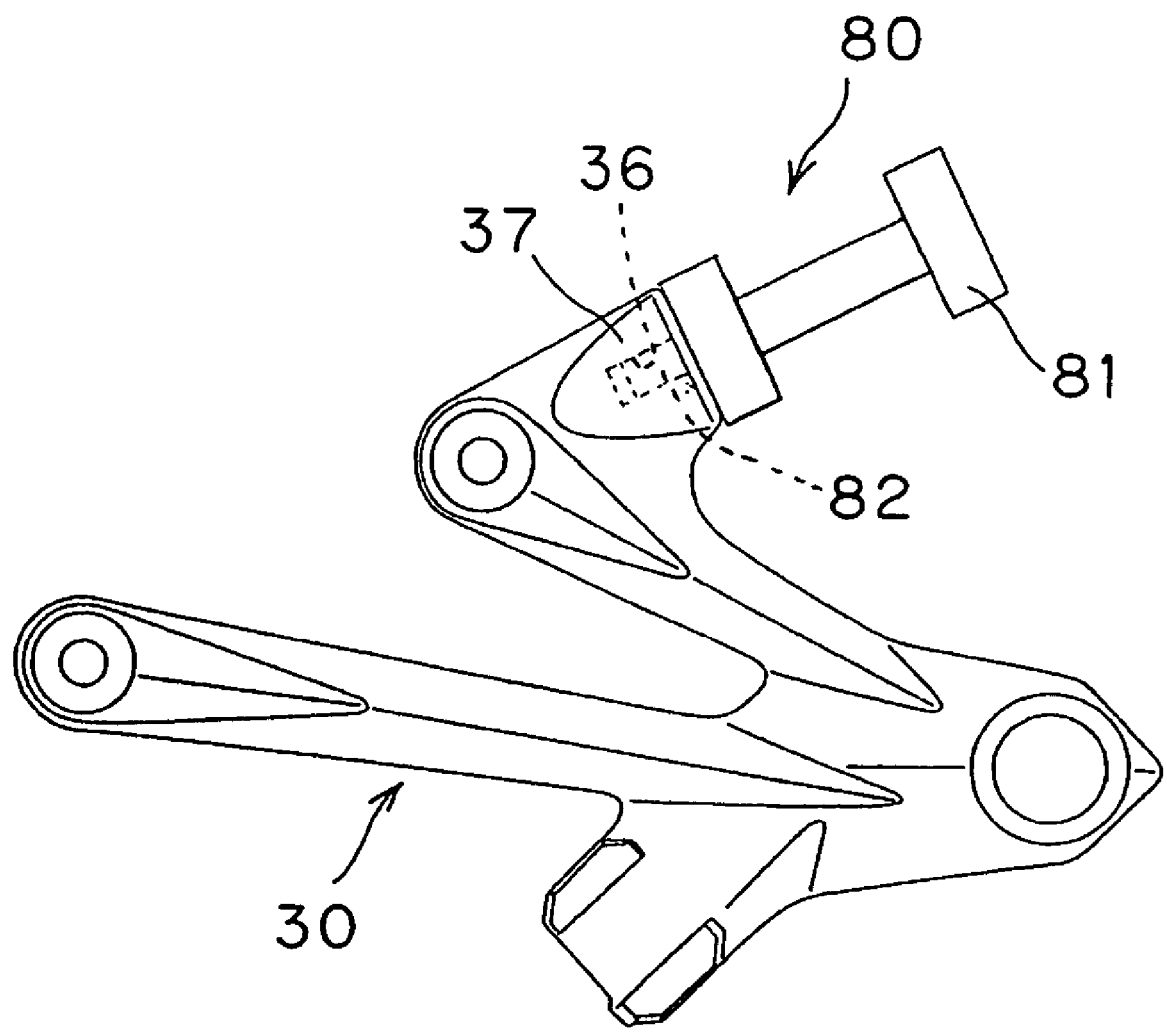
FIG. 7 is a side view, showing another rope anchor secured to the passenger footrest structure.

FIG. 7 illustrates an alternative form of the rope anchor 70 shown in FIGS. 6A to 6C. The rope anchor, now identified by 80 in FIG. 7, is in the form of a rod having its opposite ends formed with respective collars 81, one of which is formed with an externally threaded member 82 that extends in a direction remote from the other of the collars 81. The rope anchor 80 is mounted on the accessory mount 37 by threading the member 82 firmly into the internally threaded hole 36 in the accessory mount 37 of the passenger footrest structure 30.

As fully described above, it has now become clear that one of the various motorcycle accessory parts, that is, one of the grip bar 40 (FIG. 3), the pannier case stay 50 (FIG. 4), the helmet holder 60 (FIG. 5) and the rope anchor 70 (FIG. 6), 80 (FIG. 7) can be selectively and firmly mounted on the accessory mount 37 of the passenger footrest structure 30. Accordingly, the passenger footrest structure of the present invention is effective to dispense with the conventional use of one or more separate brackets each dedicated to a particular motorcycle accessory part, resulting in reduction of the number of component parts.

Also, considering that the accessory mount 37 is positioned in proximity to the connecting portion portion 35B of the passenger footrest structure 30, the accessory mount 37 has rigidity high enough to support a large load of the accessory part and an accessory carried by the accessory part. In addition, since the accessory mount 37 has the internally threaded hole 36 defined therein, the motorcycle accessory parts can be selectively secured to the passenger footrest structure 30. Specifically, the grip bar 40 (FIG. 3) and the rod-shaped rope anchor 80 (FIG. 7) can be threaded directly into the internally threaded hole 36 in the accessory mount 37, or the pannier case stay 50 (FIG. 4), the helmet holder 60 (FIG. 5) and the hook-shaped rope anchor 70 (FIG. 6) can be mounted on the accessory mount 37 through the corresponding fastening member.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, although in the foregoing description the accessory mount 37 has been shown and described as positioned in proximity to the connecting portion 35B of the passenger footrest structure 30, the accessory mount 37 may not be always positioned in proximity to the connecting portion 35B.

Also, although the accessory parts have been shown and described as threadingly connected with the accessory mount 37, such connection may be accomplished in any manner. By way of example, the accessory mount 37 may have its outer surface formed with an external thread, in which case the accessory parts should have an internally threaded member for receiving therein the external thread of the accessory mount. Also, any other coupling means, for example, mounting or engagement can be equally employed for connecting one of the accessory parts to the accessory mount.

Yet, the shape, and the material of the passenger footrest structure 30 and the method of making the passenger footrest structure 30 may not be always limited to that described above in connection with the preferred embodiment of the present invention.

Accordingly, such changes and modifications are, unless they depart from the scope of the present invention as delivered from the claims annexed hereto, to be construed as included therein.

What is claimed is:

1. A motorcycle passenger footrest structure, which comprises:
   a footrest support bracket for supporting a passenger footrest;
   a footrest mount configured for mounting the passenger footrest;
   an accessory mount formed therewith for removably mounting an accessory part other than the footrest, wherein the footrest support bracket is secured to a motorcycle frame structure on which a fellow passenger's seat is mounted; and
   a connecting portion, through which the footrest support bracket is rigidly secured to the motorcycle frame structure, wherein the accessory mount has an internally threaded hole defined therein extending diagonally upward in a rearward direction of the motorcycle frame structure.

2. The motorcycle passenger footrest structure as claimed in claim 1, wherein the accessory mount is positioned in proximity to the connecting portion.

3. The motorcycle passenger footrest structure as claimed in claim 1, wherein the internally threaded hole receives selectively one of an ornamental bolt and the accessory part.

4. The motorcycle passenger footrest structure as claimed in claim 1, wherein the accessory part is a stay for supporting a pannier case.

5. The motorcycle passenger footrest structure as claimed in claim 1, wherein the footrest support bracket is secured to the motorcycle frame structure at one end.

6. The motorcycle passenger footrest structure as claimed in claim 1, wherein the passenger footrest is pivotally supported on the footrest mount to provide folded and laid positions.

7. The motorcycle passenger footrest structure as claimed in claim 1, the footrest mount occupying a position distant from the accessory mount.

8. The motorcycle passenger footrest structure as claimed in claim 1, wherein the footrest support bracket is secured to each of left and right sides of the motorcycle frame structure.

9. The motorcycle passenger footrest structure as claimed in claim 1, wherein the accessory mount is positioned laterally outwardly from the motorcycle frame structure, so that the accessory part is mounted laterally outwardly of the motorcycle frame structure.

10. The motorcycle passenger footrest structure as claimed in claim 1, wherein the footrest support bracket is of a V-shaped configuration having two arms and a joint formed by the two arms, each arm having a free end portion to be secured to the motorcycle frame structure and the passenger footrest being supported on the joint.

11. The motorcycle passenger footrest structure as claimed in claim 10, wherein the accessory mount is provided with a mounting face;
    wherein the free end portions of the two arms define connecting portions; and
    wherein the mounting face is positioned in proximity to one of the connecting portions, a distance between the proximate connecting portion and the mounting face being chosen to be equal to or smaller than a distance between the connecting portions.

12. The motorcycle passenger footrest structure as claimed in claim 1, wherein the accessory part is a grip bar.

13. The motorcycle passenger footrest structure as claimed in claim 1, wherein the accessory part is a helmet holder for holding a protective helmet.

14. The motorcycle passenger footrest structure as claimed in claim 1, wherein the accessory part includes a cylinder lock.

15. The motorcycle passenger footrest structure as claimed in claim 1, wherein the accessory part is a rope anchor for engaging a package tying rope.

16. A motorcycle passenger footrest structure, which comprises:
    a unitary footrest support bracket for supporting a passenger footrest including a footrest mount configured for mounting the passenger footrest; and
    an accessory mount is formed integrally therewith for removably mounting an accessory part other than the footrest,
    wherein the footrest support bracket is secured to a motorcycle frame structure; and
    wherein the footrest support bracket is of a V-shaped configuration having two arms connected at a joint of the two arms, each arm having a free end portion to be secured to the motorcycle frame structure and the passenger footrest being supported on the footrest mount positioned at the joint, wherein the accessory mount has an internally threaded hole defined therein and extending diagonally upwardly in a rearward direction of the motorcycle frame structure.

17. The motorcycle passenger footrest structure as claimed in claim 16, wherein the passenger footrest is pivotally supported adjacent the joint and an ornamentally configured bolt is threaded into the internally threaded hole to secure the accessory part.

18. A motorcycle passenger one piece footrest structure, which comprises:
    a footrest support bracket for supporting a passenger footrest;
    a footrest mount configured for mounting the passenger footrest; and
    an accessory mount formed therewith for removably mounting an accessory part other than the footrest, wherein the footrest support bracket is configured to be secured to a motorcycle frame structure on which a fellow passenger's seat is mounted, wherein the footrest support bracket is of a V-shaped configuration having two arms and a joint formed by the two arms, each arm having a free end portion to be secured to the motorcycle frame structure and the passenger footrest being supported on the footrest mount positioned at the joint wherein the accessory mount is provided with a mounting face;

wherein the free end portions of the two arms define connecting portions; and wherein the mounting face is positioned in proximity to one of the connecting portions, a distance between the proximate connecting portion and the mounting face being chosen to be equal to or smaller than a distance between the connecting portions.

19. The motorcycle passenger footrest structure as claimed in claim 18 wherein the accessory part is a grip bar.

20. The motorcycle passenger footrest structure as claimed in claim 18 wherein the accessory part is a helmet holder for holding a protective helmet.

21. The motorcycle passenger footrest structure as claimed in claim 18 wherein the accessory part includes a cylinder lock.

* * * * *